United States Patent
Nakashima et al.

(10) Patent No.: US 9,881,233 B2
(45) Date of Patent: Jan. 30, 2018

(54) IMAGE RECOGNITION APPARATUS

(71) Applicant: DENSO CORPORATION, Kariya, Aichi-pref. (JP)

(72) Inventors: Akira Nakashima, Kariya (JP); Tetsuya Kimata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/869,698

(22) Filed: Sep. 29, 2015

(65) Prior Publication Data
US 2016/0092752 A1   Mar. 31, 2016

(30) Foreign Application Priority Data

Sep. 30, 2014   (JP) .................................. 2014-199993

(51) Int. Cl.
*G06K 9/00*      (2006.01)
*G06K 9/62*      (2006.01)
*G06F 17/30*     (2006.01)

(52) U.S. Cl.
CPC ..... *G06K 9/6202* (2013.01); *G06F 17/30256* (2013.01); *G06K 9/00973* (2013.01); *G06T 2207/30261* (2013.01)

(58) Field of Classification Search
CPC .............. G06K 9/00973; G06K 9/6202; G06T 2207/30261; G06T 7/003; G06F 17/30256
See application file for complete search history.

(56) References Cited

U.S. PATENT DOCUMENTS

2005/0226508 A1*  10/2005  Gotohda ............ G06K 9/00362
                                                                 382/190
2012/0051628 A1*  3/2012   Noguchi ........... G06F 17/30259
                                                                 382/159

FOREIGN PATENT DOCUMENTS

| JP | H04-086956 A | 3/1992 |
|----|--------------|--------|
| JP | H04-086959 A | 3/1992 |
| JP | H07-280517 A | 10/1995 |
| JP | 2010-117952 A | 5/2010 |
| JP | 2014-063281 A | 4/2014 |

OTHER PUBLICATIONS

Machine translated JP2010117952(A), Hagiwara Masafumi et al, May 27, 2010, pp. 1-29.*

* cited by examiner

*Primary Examiner* — Yon Couso
(74) *Attorney, Agent, or Firm* — Knobbe, Martens, Olson & Bear, LLP

(57) ABSTRACT

An image recognition apparatus includes a storage unit which stores a plurality of pieces of identical recognition reference data which are used as references for recognizing a specific object from an image, an image recognition unit which recognizes the specific object by alternately making a switch between the plurality of pieces of recognition reference data, on a frame basis, stored in the storage unit, for consecutive frames of the image acquired by an image acquisition unit, and a recognition determining unit which, on condition that recognition results obtained by the image recognition unit by using the plurality of pieces of recognition reference data meet a predetermined matching condition, outputs the recognition results as effective recognition results.

9 Claims, 5 Drawing Sheets

| RECOGNITION REFERENCE DATA1 RECOGNITION RESULT | RECOGNITION REFERENCE DATA2 RECOGNITION RESULT | RECOGNITION REFERENCE DATA3 RECOGNITION RESULT | FINAL RESULT |
|---|---|---|---|
| ○ | ○ | ○ | ○ |
| ○ | ○ | ✕ (TARGET OF RECOVERY) | ○ |
| ○ | ✕ (TARGET OF RECOVERY) | ○ | ○ |
| ✕ (TARGET OF RECOVERY) | ○ | ○ | ○ |
| ✕ | ✕ | ○ (TARGET OF RECOVERY) | ✕ |
| ✕ | ○ (TARGET OF RECOVERY) | ✕ | ✕ |
| ○ (TARGET OF RECOVERY) | ✕ | ✕ | ✕ |
| ✕ | ✕ | ✕ | ✕ |

○ : OBJECT DETECTED (RECOGNITION OK)
✕ : OBJECT NOT DETECTED (RECOGNITION FAILED)

IMAGE RECOGNITION APPARATUS

CROSS-REFERENCE TO RELATED APPLICATION

This application is based on and claims the benefit of priority from earlier Japanese Patent Application No. 2014-199993 filed Sep. 30, 2014, the description of which is incorporated herein by reference.

BACKGROUND

Technical Field

The present invention relates to an image recognition apparatus that recognizes a specific object from an image, by using recognition reference data for image recognition.

Related Art

Techniques for detecting objects, such as persons, vehicles, or the like, are well known. According to such a technique, an image is captured by a camera or the like and the captured image is subjected to image recognition which is based on an image recognition algorithm, such as pattern matching, using recognition reference data in which image features of objects are described. For example, JP-A-2014-063281 describes a technique with which template matching processing is performed using models representing image features of eyes (recognition reference data), and the position of a retrieved eye is traced.

In the image recognition technique as mentioned above, a fault that may be caused in the recognition reference data can cause erroneous recognition of an object. To cope with this, the recognition reference data may be monitored on a real-time basis in case of fault, but this is not realistic because the processing load is unavoidably increased.

SUMMARY

An embodiment provides a technique for preventing erroneous recognition caused by faulty recognition reference data.

As an aspect of the embodiment, an image recognition apparatus includes: a storage unit which stores a plurality of pieces of identical recognition reference data which are used as references for recognizing a specific object from an image; an image recognition unit which recognizes the specific object by alternately making a switch between the plurality of pieces of recognition reference data, on a frame basis, stored in the storage unit, for consecutive frames of the image acquired by an image acquisition unit; and a recognition determining unit which, on condition that recognition results obtained by the image recognition unit by using the plurality of pieces of recognition reference data meet a predetermined matching condition, outputs the recognition results as effective recognition results.

DETAILED DESCRIPTION OF THE PREFERRED EMBODIMENTS

With reference to the accompanying drawings, hereinafter are described some embodiments of the present invention. Note that the present invention should not be construed as being limited to the following embodiments, but may be implemented in various modes.

<First Embodiment>

[Regarding a Configuration of an Image Recognition Apparatus 1a]

Figure 1:
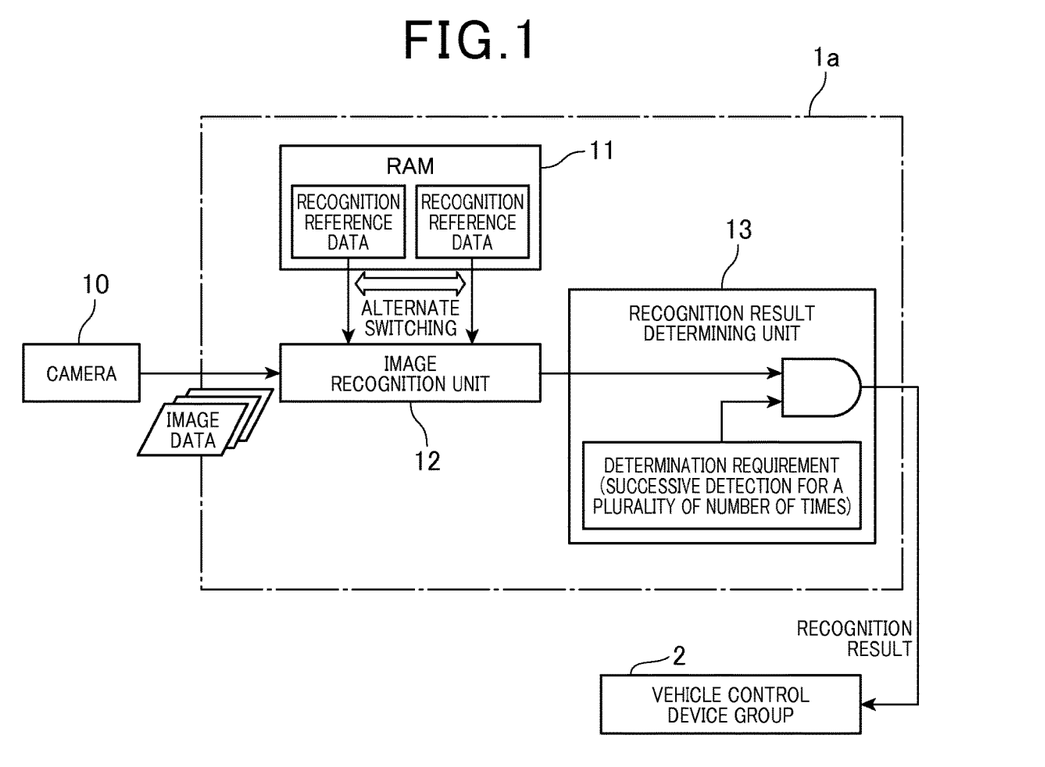
FIG. 1 is a block diagram illustrating a configuration of an image recognition apparatus according to a first embodiment.

Referring to FIG. 1, the configuration of the image recognition apparatus 1a according to the first embodiment will be described. The image recognition apparatus 1a is configured by a computer (not shown) that includes a CPU, a ROM and a RAM. The image recognition apparatus 1a has a function of performing an image recognition process for recognizing a specific object from an image captured by a camera 10 (image acquisition unit). For example, the image recognition apparatus 1a is implemented as an in-vehicle system which is mounted to a vehicle to play a part of detecting objects and provide the information on objects used for various vehicle control processes (which will be described later). The image recognition apparatus 1a includes, as a configuration characteristic of the present invention, a RAM (storage unit) 11, a recognition processing unit 12, and a recognition result determining unit (recognition determining unit) 13.

The camera 10 repeatedly picks up an image of the surrounding environment to acquire image data, and outputs the acquired image data to the recognition processing unit 12. The RAM 11 is a storage device (random access memory) used as a main memory of the CPU. The RAM 11 stores recognition reference data for use in image recognition which is conducted by the image processing unit 12. The recognition reference data include descriptions of image features of objects to be detected, such as persons or non-person objects, in image recognition. The RAM 11 has two storage areas in which identical recognition reference data are expanded.

The recognition processing unit 12 uses the recognition reference data expanded in the RAM 11 to apply well-known image recognition processing to an image picked up by the camera 10, thereby detecting an image of an object from the image. The recognition processing unit 12 performs image recognition processing using the two pieces of identical recognition reference data expanded in the RAM 11. Specifically, in the image recognition processing, the processing unit 12 alternately makes a switch between the two pieces of identical recognition reference data on a frame basis, for the time-series image data inputted from the camera 10, and outputs a recognition result for each frame to the recognition result determining unit 13. The switching between the two pieces of recognition reference data can be performed by changing the address of a read destination of the RAM 11 for each frame.

The recognition result determining unit 13 determines whether or not a predetermined determination requirement is met by the frame-specific recognition results of the image recognition processing that has been conducted of the series of image data by the recognition processing unit 12. The determination requirement is defined to be that an effective recognition result indicating an identical piece of information, i.e. either "object detected" (recognition OK) or "object not detected" (recognition NG), has been successively detected for a plurality of number of times. If the frame-specific recognition result in consecutive frames meets the determination requirement, the recognition result determining unit 13 outputs the recognition result as an effective recognition result. On the other hand, if the determination requirement is not met, the recognition result determining unit 13 determines the recognition result as being ineffective. The recognition result that has been outputted as being effective by the recognition result determining unit 13 is outputted to a vehicle control device group 2, so that the effective recognition result is used as information to be presented to the driver of the vehicle, or is used for vehicle control associated with safety driving.

The vehicle control device group 2 is composed of a plurality of devices that control the operation of various controlled objects, such as a body system, a powertrain system, or a chassis system. The controlled objects specifically include, for example, a steering gear, a speaker, a display, a brake gear, a driving gear, a light, and the like. The devices configuring the vehicle control device group 2 controls the operation of the controlled objects according to a traveling state of the vehicle, or the recognition result of an object obtained from the image recognition apparatus 1*a*. Specifically, the devices in the group 2 perform known vehicle controls, such as collision avoidance, speed warning, lane departure prevention, collision warning, inter-vehicle warning, lane departure warning, automatic high beam control, sign indication, full speed adaptive cruise control (ACC), lane keeping, lane change accident prevention, blind spot warning, blind spot monitoring, automatic lane change, cross traffic warning, erroneous pedal depression prevention, automatic parking, and the like.

[Regarding Image Recognition Process]

Figure 2:
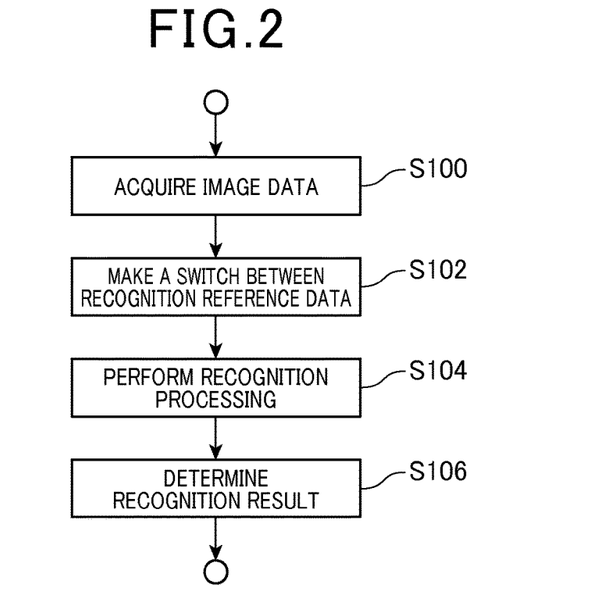
FIG. 2 is a flow diagram illustrating an image recognition process.

Referring to FIG. 2, an image recognition process performed by the individual units of the image recognition apparatus 1*a* is described. FIG. 2 is a flow diagram illustrating the image recognition process. This process is performed for each frame of image data captured by the camera 10.

In step S100, the recognition processing unit 12 acquires image data corresponding to one frame as an object to be processed. In step S102, the recognition processing unit 12 makes a switch between the two pieces of recognition reference data expanded in the RAM 11, so that the recognition reference data used this time for image recognition will be different from the one used the previous time.

In step S104, the recognition processing unit 12 uses the recognition reference data switched in step S102 to recognize an image of an object from the image data acquired in step S100. Then, the recognition processing unit 12 outputs the recognition result to the recognition result determining unit 13. In step S106, the recognition result determining unit 13 compares the recognition result of this time with the recognition result of the previous time and determines whether or not the determination requirement is met. If the this-time and previous-time recognition results are identical (recognition OK or NG), the recognition result determining unit 13 outputs the this-time recognition result as an effective recognition result. On the other hand, if the this-time and previous-time recognition results are opposite to each other, the this-time recognition result is made ineffective.

[Advantageous Effects of the First Embodiment]

The image recognition apparatus 1*a* of the first embodiment can provide the following advantageous effects. In the RAM 11, two pieces of identical recognition reference data are expanded to perform image recognition by alternately making a switch between the two pieces of recognition reference data on a frame basis. With this configuration, in the event that one item of recognition reference data has a fault, erroneous recognition is prevented from being performed based on the faulty recognition reference data, because image recognition is not successively performed using the faulty recognition reference data.

Further, the switching between the recognition reference data used for image recognition can be performed by only changing the address with which the recognition processing unit 12 makes an access in the RAM 11. Thus, the processing time for the recognition processing unit 12 is not increased by performing the switching between the two pieces of recognition reference data. In this way, the configuration of the present embodiment can achieve a fault tolerant design which is effective for avoiding erroneous recognition based on erroneous recognition reference data, without hindering the actual processing of image recognition.

<Second Embodiment>

[Regarding the Configuration of the Image Recognition Apparatus 1*b*]

Figure 3:
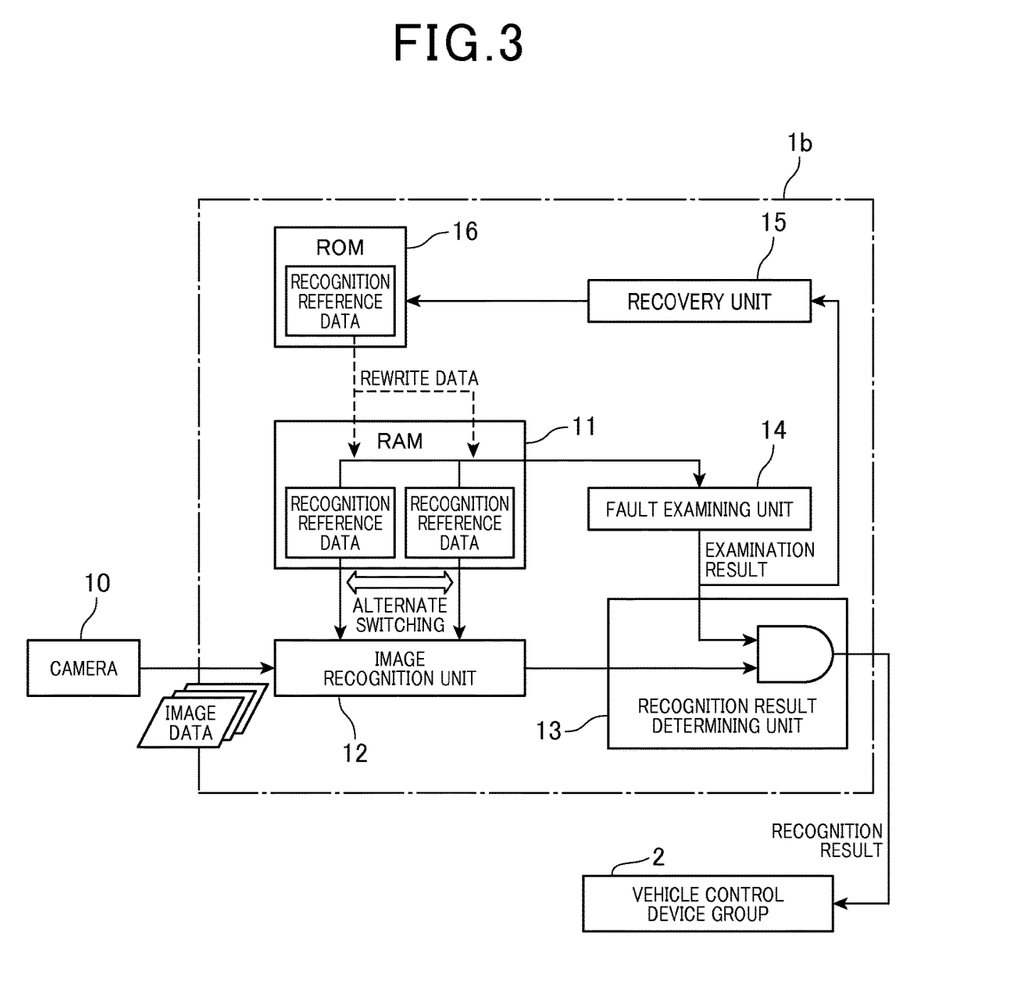
FIG. 3 is a block diagram illustrating a configuration of an image recognition apparatus according to a second embodiment.

Referring now to FIG. 3, the image recognition apparatus 1*b* of the second embodiment is described. FIG. 3 is a block diagram illustrating the configuration of the image recognition apparatus 1*b*. In FIG. 3, the components identical with or similar to those of the image recognition apparatus 1*a* of the first embodiment are given the same reference numerals for the sake of omitting unnecessary description.

As shown in FIG. 3, the image recognition apparatus 1*b* includes a RAM 11, a recognition processing unit 12, a recognition result determining unit 13, a fault examining unit 14, a recovery unit (rereading unit) 15, and a ROM (reading storage unit) 16.

The fault examining unit 14 examines presence or absence of a fault in two pieces of recognition reference data expanded in the RAM 11, and outputs the examination result to the recognition result determining unit 13 and the recovery unit 15. The configuration is provided on the premise that two pieces of identical recognition reference data are expanded in the RAM 11. The fault examining unit 14 compares the two pieces of recognition reference data with each other expanded in the RAM 11.

As a result of the comparison, if the two pieces of recognition reference data are identical, it is determined that there is no fault. However, if the two pieces of data are different from each other, it is determined that there is a fault. The fault examining unit 14 periodically examines the recognition reference data in the RAM 11 at predetermined intervals.

The recovery unit 15 recovers the recognition reference data expanded in the RAM 11 according to the examination result acquired from the fault examination unit 14. Specifically, the recovery unit 15 rewrites the plurality of pieces of recognition reference data expanded in the RAM 11 on the basis of recognition reference data stored in the ROM 16. The ROM 16 is a storage device dedicated to reading (read only memory). The ROM 16 stores recognition reference data as an original copy of the recognition reference data expanded in the RAM 11.

[Regarding a Process Performed by the Units of the Image Recognition Apparatus 1*b*]

Figure 4:
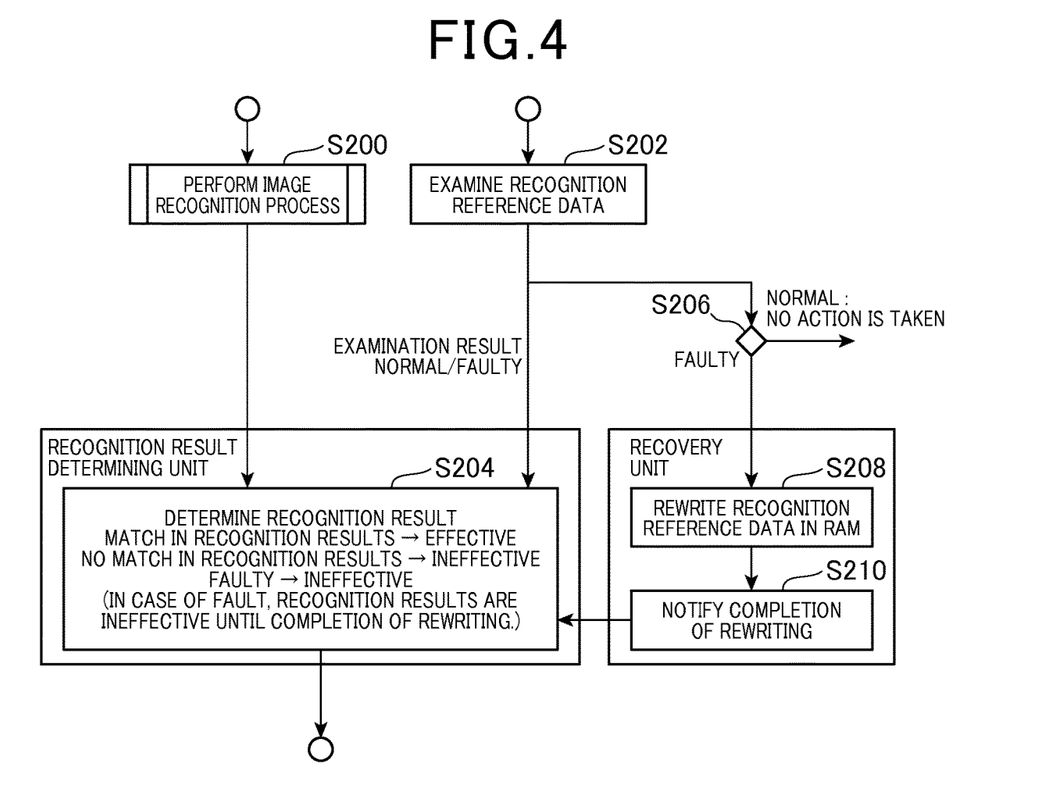
FIG. 4 is a flow diagram illustrating a process according to the second embodiment.

Referring to FIG. 4, the process performed by the individual units of the image recognition apparatus 1*b* is described. FIG. 4 is a flow diagram illustrating the process.

In step S200, the recognition processing unit 12 performs an image recognition process. In the image recognition process, the recognition processing unit 12 recognizes an image of an object by alternately making a switch, on a frame basis, between the two pieces of recognition reference data expanded in the RAM 11, for the image data captured by the camera 10. The steps involved in the image recognition process are similar to steps S100 to S104 of the flow diagram shown in FIG. 2.

On the other hand, in step S202, the fault examining unit 14 compares the two pieces of recognition reference data in the RAM 11 at a predetermined time point, and examines whether there is a fault. The fault examining unit 14 outputs the examination result (normal/faulty) of the two pieces of recognition reference data to the recognition result determining unit 13 and the recovery unit 15.

In step S204, the recognition result determining unit 13 determines whether or not the recognition results obtained from the recognition processing unit 12 meet a determination requirement which is defined to be that an identical recognition result has been successively detected for a plurality of number of times. On condition that the recognition result of this time obtained from the recognition processing unit 12 is identical with the recognition result of the previous time, i.e. on condition that the determination requirement has been met, the recognition result determining unit 13 outputs the this-time recognition result as an effective recognition result. On the other hand, if the this-time and previous-time recognition results are different from each other, the this-time recognition result is made ineffective.

However, if an examination result obtained from the fault examining unit 14 indicates presence of a fault, the recognition result determining unit 13 makes the recognition result of the moment ineffective, irrespective of pieces of information included in a plurality of recognition results. In this case, all the recognition results are made ineffective until a notification of completing rewriting of the recognition reference data is received from the recovery unit 15.

On the other hand, in step S206, the processing of the recovery unit 15 is branched, depending on whether the examination result of the fault examining unit 14 is normal or not. If the examination result is normal (normal in step S206), the recovery unit 15 takes no action. On the other hand, if the examination result indicates that there is a fault (faulty in step S206), the recovery unit 15 performs processing of step S208. In step S208, the recovery unit 15 uses the original copy of recognition reference data stored in the ROM 16 to rewrite the two pieces of recognition reference data expanded in the RAM 11. In this case, the recovery unit 15 may entirely rewrite the recognition reference data, or may rewrite only partial areas that are different from each other in the two pieces of recognition reference data in the RAM 11.

In the subsequent step S210, the recovery unit 15 outputs a notification of completing rewriting to the recognition result determining unit 13. Upon reception of the notification of completing rewriting, the recognition result determining unit 13 releases the recognition results from being in an ineffective state.

[Advantageous Effects of the Second Embodiment]

The image recognition apparatus 1*b* of the second embodiment has the following advantageous effects. For the two pieces of recognition reference data expanded in the RAM 11, presence or absence of a fault is periodically examined. If a fault is detected, the recognition result of the moment is made ineffective to thereby realize a fail-safe function. If a fault is detected in recognition reference data, the original copy of recognition reference data is reread from the ROM 16 into the RAM 11, thereby recovering the recognition reference data in question in the RAM 11.

<Third Embodiment>

[Regarding a Configuration of an Image Recognition Apparatus 1*c*]

Figure 5:
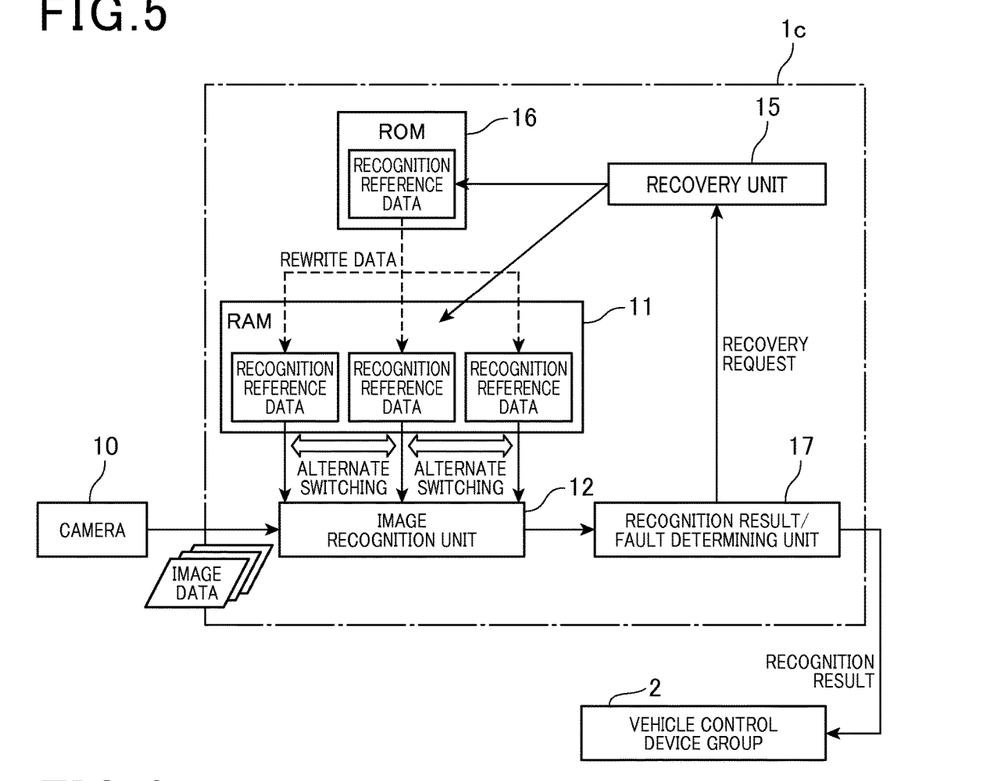
FIG. 5 is a block diagram illustrating a configuration of an image recognition apparatus according to a third embodiment.

Referring to FIG. 5, hereinafter is described a configuration of the image recognition apparatus 1*c* of a third embodiment. FIG. 5 is a block diagram illustrating the configuration of the image recognition apparatus 1*c*. In FIG. 5, components identical with or similar to those of the image recognition apparatuses 1*a* and 1*b* of the first and second embodiments are given the same reference numerals for the sake of omitting unnecessary description.

As shown in FIG. 5, the image recognition apparatus 1*c* includes a RAM 11, a recognition processing unit 12, a recovery unit 15, a ROM 16, and a recognition result/fault determining unit (fault determining unit) 17. In the third embodiment, three pieces of identical recognition reference data are expanded in the RAM 11. The recognition processing unit 12 performs an image recognition process for time-series image data inputted from the camera 10, while sequentially making a switch, on a frame basis, between the three pieces of identical recognition reference data expanded in the RAM 11. Then, the recognition processing unit 12 outputs a frame-specific recognition result to the recognition result/fault determining unit 17.

The recognition result/fault determining unit 17 finally determines a recognition result on the basis of the majority rule logic, for the recognition results of the image recognition that has been conducted using the three recognition reference data expanded in the RAM 11, for consecutive three frames of image data. Further, the recognition result/fault determining unit 17 determines whether or not there is a fault in the recognition reference data on the basis of the majority rule logic, for the recognition results based on the three recognition reference data. If a fault is detected in the recognition reference data, the recognition result/fault determining unit 17 outputs a recovery request to the recovery unit 15. In response to the recovery request from the recognition result/fault determining unit 17, the recovery unit 15 recovers the recognition reference data, i.e. targets of recovery, expanded in the RAM 11.

[Regarding a Process Performed by the Individual Units of the Image Recognition Apparatus 1*c*]

Figure 6:
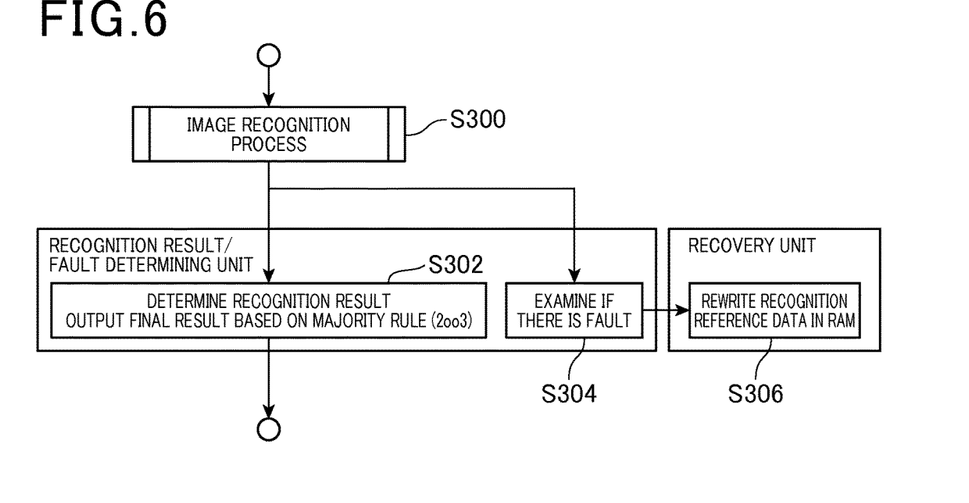
FIG. 6 is a flow diagram illustrating a process according to the third embodiment.

Referring to FIG. 6, the process performed by the individual units of the image recognition apparatus 1*c* is described. FIG. 6 is a flow diagram illustrating the process.

In step S300, the recognition processing unit 12 performs an image recognition process. In the image recognition process, the recognition processing unit 12 recognizes an image of an object by alternately making a switch, on a frame basis, between the three pieces of recognition reference data expanded in the RAM 11, for the image data captured by the camera 10. The steps involved in the image recognition data are similar to steps S100 to S104 of the flow diagram shown in FIG. 2.

Figure 7:
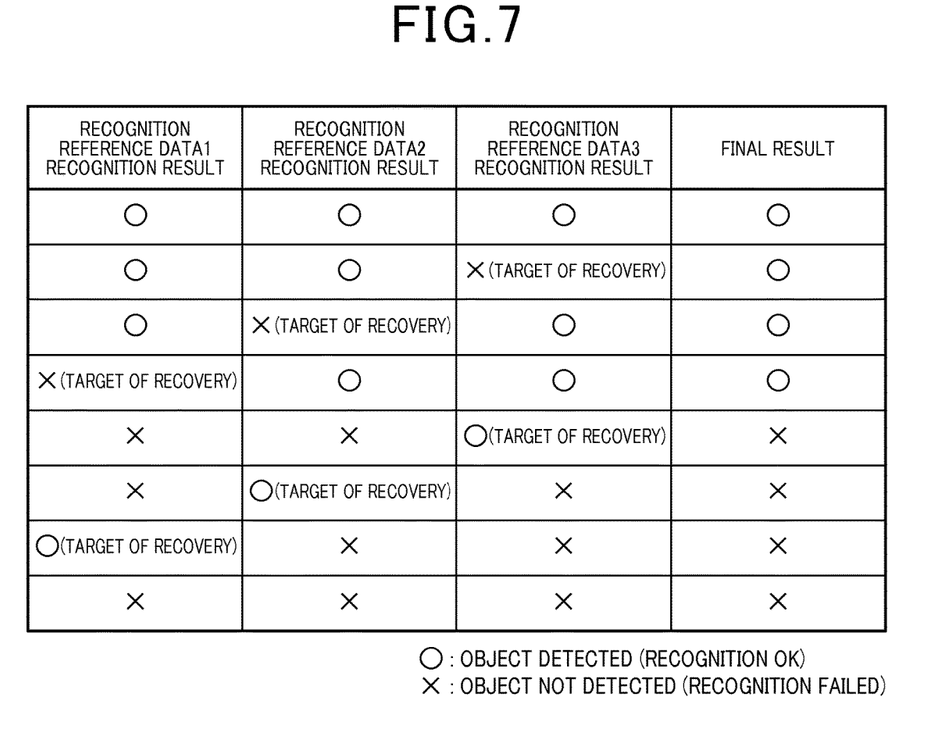
FIG. 7 is a diagram illustrating a recognition result determination table.

In step S302, the recognition result/fault determining unit 17 determines a recognition result on the basis of majority rule logic, for the recognition results of the three consecutive frames of image data inputted from the recognition processing unit 12. Specifically, as to whether each of the recognition results of the three recognition pieces of reference data in the RAM 11 corresponds to "object detected" (recognition OK) or "object not detected" (recognition NG), the recognition result/fault determining unit 17 determines the recognition results on a majority side (2-out-of-3, or 2oo3) as being a final recognition result by applying majority rule logic. In other words, as shown in FIG. 7, of the recognition results (recognition OK or NG) based on three pieces of recognition reference data 1, 2 and 3, if there is a match in two or more recognition results, these recognition results in question correspond to a final recognition result.

Reference is again made to the flow diagram of FIG. 6. In step S304, the recognition result/fault determining unit 17 determines whether or not there is a fault in the recognition reference data, on the basis of applying the majority rule to the recognition results of the three pieces of consecutive frames of the image data inputted from the recognition processing unit 12. Specifically, as to the recognition results of the three pieces of recognition reference data (recognition OK or NG) in the RAM 11, the recognition result/fault determining unit 17 determines the recognition reference data that has drawn a recognition result on a minority side (1-out-of-3, 1oo3) as being faulty by applying majority rule logic, and thus determines this recognition reference data in question as a target of recovery. In other words, as shown in FIG. 7, of the recognition results (recognition OK or NG) based on three recognition reference data 1, 2 and 3, the recognition reference data which alone has led out a different recognition result corresponds to a target of recovery.

Reference is again made to the flow diagram of FIG. 6. As a result of the examination conducted in step S304, the recognition result/fault determining unit 17 outputs a recovery request to the recovery unit 15 to instruct recovery of the recognition reference data that has been determined to be a target of recovery. In step S306, the recovery unit 15 recovers the recognition reference data that is a target of recovery expanded in the RAM 11, according to the recovery request acquired from the recognition result/fault determining unit 17. Specifically, the recovery unit 15 rewrites only the recognition reference data that is a target of recovery, using the original copy of recognition reference data stored in the ROM 16. Alternatively, the recognition result/fault determining unit 17 may rewrite the recognition reference data that is a target of recovery among the three pieces of recognition reference data expanded in the RAM 11, with the information of one of other normal recognition reference data.

[Advantageous Effects of the Third Embodiment]

The image recognition apparatus 1c of the third embodiment has the following advantageous effects. A final recognition result can be determined on the basis of majority rule logic applied to the three recognition results based on the three pieces of recognition reference data expanded in the RAM 11. With this configuration, in the event that some of the three recognition reference data have a fault, a recognition result of the image recognition process can be continuingly outputted.

Based on majority rule logic applied to the three recognition results of the three pieces of recognition reference data expanded in the RAM 11, a faulty recognition reference data can be specified. With this configuration, only the faulty recognition reference data needs to be rewritten among the three recognition reference data expanded in the RAM 11.

<Modifications>

The second and third embodiments have been described by way of an example of recovering recognition reference data in the RAM 11 when a fault has been detected in the data. Alternatively, it may be so configured that the recognition reference data in the RAM 11 is/are periodically rewritten, irrespective of the presence or absence of a fault in the recognition reference data.

The third embodiment has been described by way of an example in which, for the three consecutive frames of image data, a final recognition result is determined on the basis of majority rule logic applied to the recognition results of the image recognition that has been conducted using the three pieces of recognition reference data expanded in the RAM 11. Alternatively, it may be so configured that, for a single frame of image data, a final recognition result may be determined on the basis of majority rule logic applied to the recognition results of the image recognition that has been conducted using the three pieces of recognition reference data expanded in the RAM 11. In this case, since image recognition is conducted three times for the single frame of image data, the processing time is increased. Therefore, only a partial area of the image frame may be subjected to image recognition to thereby reduce the processing load.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

The image recognition apparatus includes a storage unit (11), an image recognition unit (12), and a recognition determining unit (13). The storage unit stores a plurality of pieces of identical recognition reference data which are used as references for recognizing a specific object from an image. The image recognition unit recognizes the specific object by alternately making a switch between the plurality of pieces of recognition reference data, on a frame basis, stored in the storage unit, for consecutive frames of the image acquired by an image acquisition unit. On condition that recognition results obtained by the image recognition unit by using the plurality of pieces of recognition reference data meet a predetermined matching condition, the recognition determining unit outputs the recognition results as effective recognition results.

In the embodiment, a plurality of pieces of identical recognition reference data are stored, and a recognition result is ensured to be finalized according to a state of match between the recognition results based on the recognition reference data. With this configuration, in the event that some of the plurality of pieces of recognition reference data are faulty, erroneous recognition is prevented from being made based on the erroneous recognition reference data in question, because image recognition is not successively conducted using the faulty recognition reference data. The configuration of the embodiment can achieve a fault tolerant design which is effective for avoiding erroneous recognition based on erroneous recognition reference data, without hindering the actual processing of image recognition.

What is claimed is:

1. An image recognition apparatus, comprising:
a storage unit, using a non-transitory computer-readable storage medium, which stores a plurality of pieces of identical recognition reference data which are used as references for recognizing a specific object from an image;
an image recognition unit, using a processor, which recognizes the specific object in images acquired by an image acquisition unit by switching between the plurality of pieces of identical recognition reference data stored in the storage unit, on a frame basis for consecutive frames of the images acquired by the image acquisition unit;
a recognition determining unit, using the processor, which, on condition that recognition results obtained by the image recognition unit by using the plurality of pieces of identical recognition reference data meet a predetermined matching condition, outputs the recognition results as effective recognition results;
an examining unit, using the processor, which examines a presence or an absence of a fault in a plurality of pieces of recognition reference data stored in the storage unit; and
a recovery unit, using the processor, which recovers the plurality of pieces of identical recognition reference data if the examining unit determines that there is a fault.

2. The image recognition apparatus according to claim 1, wherein
the examining unit periodically examines the presence or the absence of a fault.

3. An image recognition apparatus, comprising:
a storage unit, using a non-transitory computer-readable storage medium, which stores a plurality of pieces of identical recognition reference data which are used as references for recognizing a specific object from an image;
an image recognition unit, using a processor, which recognizes the specific object in images acquired by an image acquisition unit by switching between the plurality of pieces of identical recognition reference data stored in the storage unit, on a frame basis for consecutive frames of the images acquired by the image acquisition unit;
a recognition determining unit, using the processor, which, on condition that recognition results obtained by the image recognition unit by using the plurality of pieces of identical recognition reference data meet a predetermined matching condition, outputs the recognition results as effective recognition results;
a fault determining unit, using the processor, which determines a fault in the recognition reference data of an odd number of recognition results based on majority rule logic, wherein recognition results comprising a minority are determined as being faulty, and
a recovery unit, using the processor, which recovers the recognition reference data determined as being faulty by the fault determining unit.

4. A method for recognizing a specific object from acquired images, the method comprising:
storing a plurality of pieces of identical recognition reference data within a storage unit, the plurality of pieces of identical recognition reference data including references for recognizing the specific object;
recognizing the specific object within the acquired images by switching between the plurality of pieces of identical recognition reference data within the storage unit on a frame basis for consecutive frames of the acquired images;
determining whether the plurality of pieces of identical recognition reference data meet a predetermined matching condition;
outputting the recognition results as effective recognition results based on whether the plurality of pieces of identical recognition reference data meet the predetermined matching condition;
examining for a presence or an absence of a fault in a plurality of pieces of recognition reference data; and
recovering the plurality of pieces of identical recognition reference data if a fault is present in the plurality of pieces of recognition reference data.

5. The method according to claim 4, wherein
the plurality of pieces of recognition reference data are periodically examined for the presence or the absence of a fault.

6. A method for recognizing a specific object from acquired images, the method comprising:
storing a plurality of pieces of identical recognition reference data within a storage unit, the plurality of pieces of identical recognition reference data including references for recognizing the specific object;
recognizing the specific object within the acquired images by switching between the plurality of pieces of identical recognition reference data within the storage unit on a frame basis for consecutive frames of the acquired images;
determining whether the plurality of pieces of identical recognition reference data meet a predetermined matching condition;
outputting the recognition results as effective recognition results based on whether the plurality of pieces of identical recognition reference data meet the predetermined matching condition;
determining a fault in the recognition reference data of an odd number of recognition results based on majority rule logic, wherein recognition results comprising a minority are determined as being faulty, and
recovering the recognition reference data determined as being faulty.

7. A system for recognizing a specific object from acquired images, the system comprising:
a central processor;
a computer-readable storage medium which stores a plurality of pieces of identical recognition reference data which are used as references for recognizing a specific object from an image; and
a set of computer-executable instructions stored on the computer-readable storage medium that cause the central processor to implement:
recognizing the specific object within the acquired images by switching between the plurality of pieces of identical recognition reference data within the computer-readable storage medium on a frame basis for consecutive frames of the acquired images;
determining whether the plurality of pieces of identical recognition reference data meet a predetermined matching condition;
outputting the recognition results as effective recognition results based on whether the plurality of pieces of identical recognition reference data meet the predetermined matching condition;
examining for a presence or an absence of a fault in a plurality of pieces of recognition reference data; and recovering the plurality of pieces of identical recognition reference data if a fault is present in the plurality of pieces of recognition reference data.

8. The system according to claim 7, wherein the plurality of pieces of recognition reference data are periodically examined for the presence or the absence of a fault.

9. A system for recognizing a specific object from acquired images, the system comprising:
- a central processor;
- a computer-readable storage medium which stores a plurality of pieces of identical recognition reference data which are used as references for recognizing a specific object from an image; and
- a set of computer-executable instructions stored on the computer-readable storage medium that cause the central processor to implement:
  - recognizing the specific object within the acquired images by switching between the plurality of pieces of identical recognition reference data within the computer-readable storage medium on a frame basis for consecutive frames of the acquired images;
  - determining whether the plurality of pieces of identical recognition reference data meet a predetermined matching condition; and
  - outputting the recognition results as effective recognition results based on whether the plurality of pieces of identical recognition reference data meet the predetermined matching condition;
  - determining a fault in the recognition reference data of an odd number of recognition results based on majority rule logic, wherein recognition results comprising a minority are determined as being faulty; and
  - recovering the recognition reference data determined as being faulty.

* * * * *